US005895524A

United States Patent [19]
Dickson

[11] Patent Number: 5,895,524
[45] Date of Patent: Apr. 20, 1999

[54] MAKING THIN FILM METAL PARTICULATES

[75] Inventor: Micheal E. Dickson, Federal Way, Wash.

[73] Assignee: The Boeing Company, Seattle, Wash.

[21] Appl. No.: 08/771,618

[22] Filed: Dec. 20, 1996

[51] Int. Cl.$^6$ .................................................. C09C 1/62
[52] U.S. Cl. ................................ 106/404; 106/403
[58] Field of Search ............................... 106/403, 404

[56] References Cited

U.S. PATENT DOCUMENTS 5,076,849  12/1991  Vapaaoksa et al. ................. 106/481

Primary Examiner—Mark L. Bell
Assistant Examiner—Scott L. Hertzog
Attorney, Agent, or Firm—John C. Hammar

[57] ABSTRACT

Thin film metal particulates are removed from FEP sheetstock cheaply and quickly by immersing the coated FEP first in a base and then in an acid. Occasionally, ultrasonic vibration of the FEP may also be required. The particulates are useful as paint pigments. The FEP is reusable.

10 Claims, No Drawings

MAKING THIN FILM METAL PARTICULATES

TECHNICAL FIELD

The present invention relates to a method for making thin film metal particulates useful as paint pigments.

BACKGROUND OF THE INVENTION

Thin film metal particulates are expensive, because existing process to make them, like those described in U.S. Pat. Nos. 4,879,140 or 5,100,599, use exotic equipment such as plasma generators or vacuum chambers, or are labor intensive, small scale processes like photolithography. The prior art particulates are not readily produced in reasonable volume, and cost as much as $5,000/oz. At these prices, paints that use the particulates as the pigment are only suitable for highly specialized applications. There is a need for a lower cost, higher volume process for rapidly and reliably making thin film metal particulates usable as paint pigments.

SUMMARY OF THE INVENTION

The present invention is an inexpensive method to rapidly manufacture thin film metal particulates usable as paint pigments. The method involves immersing a metallized sheet of fluorinated ethylene propylene (FEP) first in an aqueous base and then in an aqueous acid to loosen and release the metal from the FEP. The particulates are brushed from the FEP into the acid tank, and are recovered. The FEP is reusable. The particulates are usually aluminum or germanium metal having a thickness of about 900 to 1100 Å, and preferably, 1000 Å.

The method may also include ultrasonically vibrating the metallized sheet following the immersions.

For making aluminum particulates, the preferred base is 7% $Na_2CO_3$ and the preferred acid is 0.01–0.1N acetic acid. For making germanium particulates, the preferred base is 2.5N NAOH, since this metal is harder to loosen from the FEP. The acid bath neutralizes the basic reaction between the metal film and base.

DETAILED DESCRIPTION OF THE INVENTION

The present invention is a low cost, reasonably high volume method for making thin film aluminum or germanium particulates. The particulates are useful as pigments in paint, but their current costs of as much as $5,000/oz. restricts their adoption. Preferred particulates are essentially price metals (with suitable surface conversion coatings) having a thickness of about 1000 Å±5–10%. The particulates otherwise should meet the conventional specifications for paint pigments. In that regard the particulates (also sometimes called flakes) must be thick enough to provide opacity while producing minimum edge effects (scattering). A characteristic dimension, then, for either the length or width would be 20–100 µm, and, preferably, 30–50 µm. We target, then, particulates of characteristic dimensions of 50 µm×50 µm×1000 Å ( i.e. 1 µm).

We have discovered that films of the desired thickness can be prepared by sputtering the metal onto 2 mil thick fluorinated ethylene propylene (FEP) sheetstock. Making this film product is done according to the conventional processing steps for making food or vacuum bagging materials. The method of the present invention removes the metal from the metallized film in two, simple and quick immersion steps.

First, the metallized roll is immersed in a caustic (basic) bath for about 15 sec to loosen the metal. Then, we immerse the roll again for about 15 sec in a dilute acid solution to neutralize the base and to separate the metal. We brush the particulates from the FEP, and precipitate the particulates in the acid solution prior to filtering, rinsing, and drying.

To separate the metal from the FEP I generally contact the metal with one or more counter rotating cylindrical nylon bristle brushes. I sometimes use ultrasonic vibration alone or in combination with the brushing.

For aluminum thin films, I prefer to use 7% by wt. $Na_2CO_3$ as the base, but can use $NaHCO_3$, $NaCO_3/NaHCO_3$ mixtures, or conventional alkaline or alkaline earth hydroxides diluted to about a pH of 9.0. The acid solution preferably is 0.01–0.1N acetic acid at pH 3.4–3.6, but could be phosphoric acid or a dilute mineral acid.

For germanium thin films, I prefer to use 2.5N NaOH as the base with acetic acid or with ultrasonic vibration replacing the acid solution.

For brushes, I prefer 3 inch nylon bristle (0.010 inch diameter) spiral wound brushes available from Richards Brush Company.

The base immersion takes about 15 seconds. Prior to the acid immersion, I allow the base-treated metallized film to be exposed to air for about 25 seconds. The acid immersion lasts about 15 seconds before I brush the particulates from the FEP. I tow the metallized roll through the several operations in a continuous process, as will be understood by those of ordinary skill.

I monitor the pH of the acid tank with conventional pH or ORP meters and add acid as necessary to maintain the desired pH and redox potential.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

I claim:

1. A method for removing thin film particulates from a fluorinated ethylene propylene (FEP) release film, comprising the steps of:
   (a) depositing metal onto a sheet of fluorinated ethylene propylene (FEP) sheetstock to form a thin film;
   (b) immersing the coated FEP in a base to loosen the thin film from the FEP; and
   (c) immersing the loosened thin film on the FEP in an acid to neutralize the base and to remove the thin film metal in particulate form.

2. The method of claim 1 wherein the acid is 0.01–0.1 N acetic acid.

3. The method of claim 2 wherein the metal is germanium and the base is sodium hydroxide.

4. The method of claim 2 wherein the metal is aluminum and the base is sodium carbonate.

5. The method of claim 4 wherein the base immersion occurs for about 15 seconds and the acid immersion occurs about 25 seconds later after exposure to air.

6. The method of claim 1 further comprising the step of exposing the thin film after the acid immersion to ultrasonic vibration in a water bath.

7. The method of claim 1 wherein the metal is aluminum and the base is an aqueous solution of $Na_2CO_3$, $NaHCO_3$, or mixtures thereof.

8. The method of claim 7 wherein the acid is an aqueous solution of acetic acid, phosphoric acid, or mixtures thereof at a pH of about 3.4–3.6.

9. The method of claim 1 further comprising the step of recycling the FEP sheetstock for depositing additional metal.

10. The method of claim 1 wherein the metal is about $1000 \pm 100$ Å thick.

* * * * *